CALL FORWARDING ARRANGEMENT

Filed Oct. 12, 1966 3 Sheets-Sheet 1

INVENTOR
JAMES G. PEARCE

BY Dicke + Craig
ATTORNEYS

Dec. 23, 1969 J. G. PEARCE 3,485,957

CALL FORWARDING ARRANGEMENT

Filed Oct. 12, 1966 3 Sheets-Sheet 2

JAMES G. PEARCE
INVENTOR

BY Dicke + Craig
ATTORNEYS

CALL FORWARDING ARRANGEMENT

Filed Oct. 12, 1966 3 Sheets-Sheet 3

JAMES G. PEARCE
INVENTOR

BY Dicke + Craig
ATTORNEYS

1

3,485,957
CALL FORWARDING ARRANGEMENT
James G. Pearce, Liverpool, England, assignor to Stromberg-Carlson Corporation, Rochester, N.Y., a corporation of Delaware
Filed Oct. 12, 1966, Ser. No. 586,124
Int. Cl. H04m 3/38
U.S. Cl. 179—18 8 Claims

ABSTRACT OF THE DISCLOSURE

Call forwarding arrangement wherein a temporary memory storing call forwarding information in connection with particular subscribers is automatically accessed only after it is determined that these subscribers have a call forwarding class of service available.

The present invention relates in general to communication systems, and more particularly, to a call forwarding arrangement for use in connection with electronic telephone systems.

As a means of enhancing the versatility of the telephone and encouraging its continued and frequent use, various class of service features have been provided in addition to the mere completion of a voice transmission path. Some of these class of service features which make telephone service more useful include line lock-out, executive right of way, add-on conference, toll ticketing and call forwarding. Prior to the advant of automatic telephone equipment, most of the special features were provided manually by the telephone operator in response to special instructions from the subscriber. For example, the operator might have been asked to complete calls only after a certain time, or only from certain people, or the operator might have been requested to transfer all calls for a first party to a second party's line. However, in automatic telephone systems, where the processing of a telephone call has been taken out of the hands of the manual operator and entrusted to electronic switching equipment, it is also desirable to provide means for establishing the special class of service functions in an automatic manner.

It is therefore a general object of the present invention to provide in an electronic telephone system a fully automatic arrangement for effecting call forwarding class of service.

It is another object of the present invention to provide in an electronic telephone system facilities to complete connections to one station although originally directed to another station.

It is a further object of the present invention to provide facilities in a telephone communication system which respond to directive signals from a first station to transfer any connections directed to said first station to a selected alternate station.

In the generally known call forwarding arrangement for use in electronic telephone systems, the subscriber having the proper class of service is able, by dialing an access code followed by a number, to route all of his incoming calls to the number he has dialed. This operation is carried out in conjunction with a special memory provided in the telephone system which is made accessible upon dialing of the proper access code indicating a call forwarding class of service. The membory then receives a dialed number in addition to the directory number of

2 the party and stores this information for subsequent use in connection with attempts to communicate with the party having the calling forwarding class of service.

In the known arrangement, after the call forwarding information along with the directory number of the party has been stored in the special memory, each call handled by the electronic telephone system will refer to this memory to determine if the called party has the special call forwarding class of service and has in fact provided instructions for forwarding the call to another number. However, as can be imagined, the need to access the memory for each call handled by the electronic telephone system to determine if it in fact is subject to special class of service routing requires complicated and expensive control circuitry and places undue requirements upon the memory which is provided for purposes of recording this special class of service information.

The present invention provides a call forwarding arrangement for use with electronic telephone systems wherein once the class of service information and transfer number are recorded in the special features memory, means are provided in association with the telephone system for detecting prior to recourse to the special features memory whether a called number has a class of service requiring access to the memroy. Only if the called number has a special class of service will access be made to the memory to determine whether or not a message exists therein in connection with this dialed number for the special class of service involved. This, in effect, eliminates the need to access the memory for each call handled by the telephone system, and therefore materially reduces if not altogether eliminates the disadvantages inherent in known systems of a similar nature.

These and other objects, features and advantages of the present invention will be more apparent from the following detailed description of the invention, when taken in combination with the accompanying drawings, which illustrate one embodiment of the present invention and wherein.

Figure 1:
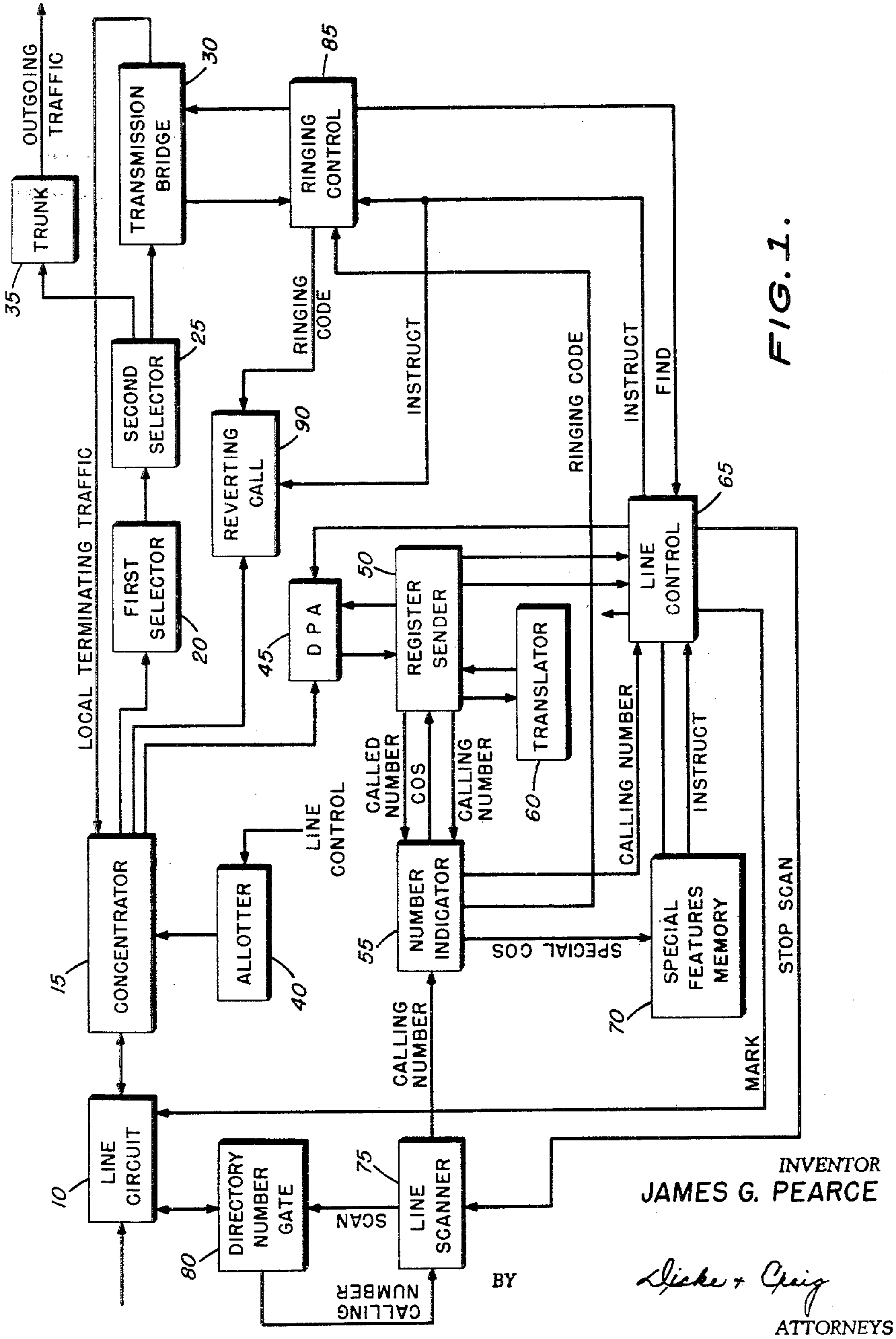
FIGURE 1 is a schematic block diagram of a space division electronic telephone switching system with which the present invention may be utilized.

Referring now to the drawings, FIGURE 1 illustrates a typical space division electronic switching system with which the call forwarding arrangement of the present invention may be associated. However, it is to be understood that the present invention may be related to other systems than the one specifically illustrated in FIGURE 1 and described herein, as will be apparent from an understanding of the general principles of the invention. In fact, the call forwarding arrangement of the present invention has general utility in all space division and time division multiplex electronic telephone systems.

In FIGURE 1, one of a plurality of line circuits 10 is connected through a concentrator 15, first selector 20 and second selector 25 to transmission bridge 30 which forms a standard output junctor providing an output back to the concentrator 15 for application of local calls to a called line circuit. Outgoing traffic is connected from the output of the second selector 25 through trunk circuit 35. An alotter 40 is connected to concentrator 15 and conrolled by line control 65 in the well known manner.

One of a plurality of dial pulse acceptors 45 is shown in FIGURE 1 as connected to the output of concentrator 15, which accepts and stores dialed impulses received from the concentrator 15 and applies this dialed information to the register sender 50 for further processing. Associated with register sender 50 is a translator or number indicator 55 which forms a temporary memory providing class of service COS information regarding both the called and the calling parties, as is well known. The number of the called party is provided from the dialed information received through the dial pulse acceptor 45 and the directory number of the calling party is received via the directory number gate 80 and line scanner 75 connected to the line circuit 10. Class of service information is then applied from the number indicator 55 to the register sender 50 and also to a special features memory 70 which permits the storage of numbers for call forwarding and the storage of information to route calls to telephone answering services and for other special functions.

There is also associated with the register sender 50 a translator 60 which is in the form of a permanent memory providing the required routing information to steer a call to its destination and also providing a translation of all dialed codes received through the dial pulse acceptor 45. In response to routing information received from the number indicator 55 and translator 60, the register sender 50 effects control of the line control 65 to mark the calling and called line circuits and to apply ring back and ringing, respectively, thereto, through control of ringing control 85 which is connected to transmission bridge 30. The ringing code for the particular parties involved is received from the number indicator 55 and connected directly to the ringing control 85.

The line control 65 also provides control of a revertive call circuit 90 which is also connected to the ringing control 85 and derives necessary ringing control both for the calling and called parties therefrom. The ringing generated in the revertive call circuit 90 is then applied back through the concentrator 15 to the line circuit associated with the reverting call.

The general operation of the system illustrated in FIGURE 1 for establishing a communication connection between subscribers associated with different line circuits, whether local or outgoing, is sufficiently well known that a detailed description thereof herein is believed unnecessary. Therefore, the description of the operation of FIGURE 1 will be only sufficiently detailed to provide a basis of understanding for the call forwarding arrangement of the present invention.

The line scanner 75 constantly tests each line circuit to determine whether it requires connection to the register equipment to establish a path to the required subscriber. As soon as it finds such a line, the scanning operation is stopped through control from line control 65. The number of the calling line is now signalled to the number indicator 55 from the directory number gate 80 of line scanner 75 and the number indicator 55 applies this calling number to the line control 65, which in turn marks the calling line circuit 10. The line control 65 selects a dial pulse acceptor 45 at the time the originating line circuit 10 is marked. At this time, the cross points in the selected path through the concentrator 15 are closed, connecting the line circuit 10 to the dial pulse accepter 45. The calling subscribers' line is now extended directly into the register which returns dial tone and awaits receipt of dialed information from the subscriber. The dialed information is then received in the pulse accepter 45 and applied to the register sender 50.

When the register sender 50 has received the dialed directory number of the called party from the dial pulse accepter 45, it signals the line control 65 to acquire the ringing control circuit 85. At the same time, the number indicator 55 at the receipt of the called number from the register sender 50 provides the proper ringing code for the called subscriber, which code is applied to the ringing control 85. The ringing control 85 stores the ringing code and applies it in control of ringing the called line.

Figure 2:
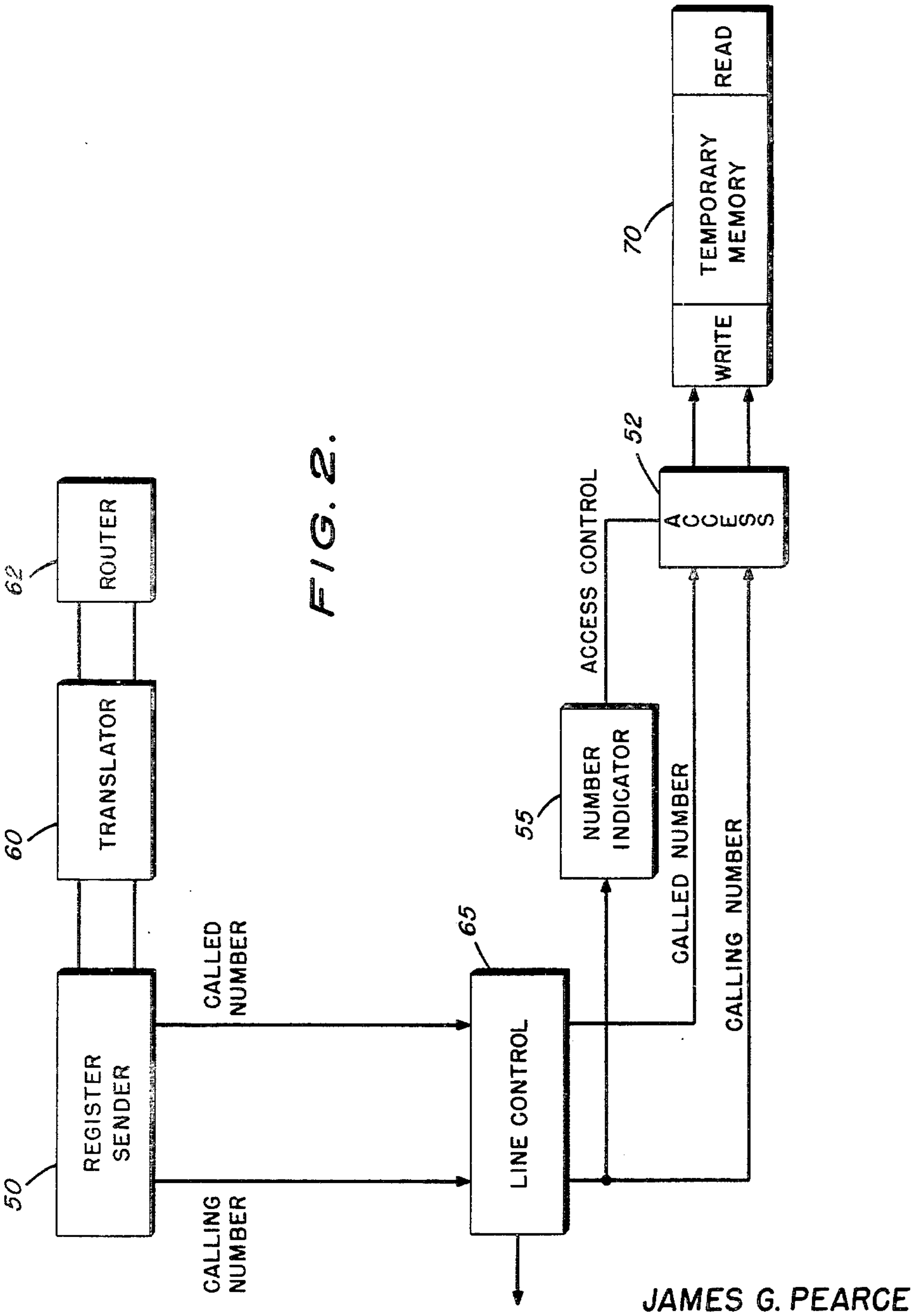
FIGURE 2 is a schematic block diagram of the arrangement in accordance with the present invention for recording instructions in connection with a call forwarding class of service.

Referring now to FIGURE 2, which illustrates those components of the basic telephone switching system of FIGURE 1 used for inserting into the memory special feature class of service instructions relating to call forwarding in accordance with the present invention, a call router 62 is provided in connection with the translator 60 for purposes of directing the control via the register sender 50 in accordance with the special feature write-in codes received via the translator 60. There is also provided in association with the number indicator 55 and temporary memory 70 a means for providing access from the line control 65 to the temporary memory 70 under control of the number indicator 55 upon detection of the proper class of service associated with the dialed information.

When a subscriber having the proper class of service wishes to have all of his calls transferred to another number, he need only dial the special class of service code plus the four digits of the transfer number to which the calls are to be referred. This information is applied in the well known manner via the line circuit 10. Concentrator 15 and dial pulse acceptor 45 to the register sender 50 (FIG. 1). The register sender applies the class of service code dialed by the subscriber to the translator 60 to determine what class of service is requested so as to determine the further processing of the call. At the same time, the directory number of the calling party is received through the directory number gate 80 and line scanner 75 and applied to the number indicator 55 which provides the register sender 50 with the class of service available to the calling party.

The translator determines from the dialed access code that the class of service requested is call forwarding and applies this information to the router 62, which determines the path along which the transfer number in the register sender is to be directed. The control information received from the router 62, via the translator 60 and applied to the register sender 50 affects application of the transfer number from the register sender 50 upon confirmation from the number indicator 55 that the calling party does in fact have the proper class of service, to the line control 65 along with the calling number received from the number indicator 55. Both the called number and the calling number are then applied from the line control 65 to access circuit 52 to the temporary memory 70. The number indicator 55 having determined that the calling number may rightly obtain the present class of service operates the access circuit 52 to apply both the called number and the calling number to the temporary memory 70.

Figure 4:
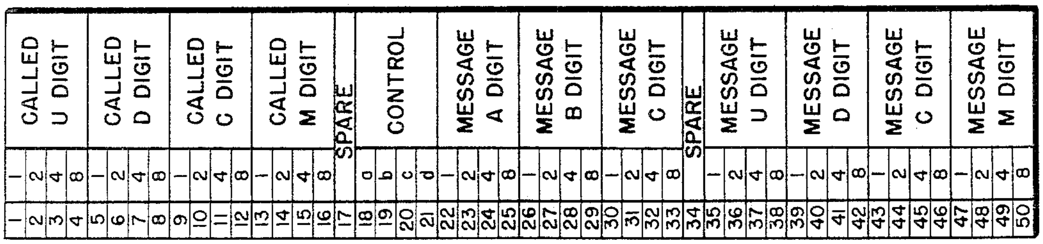
FIGURE 4 is a chart of the bits in a memory cell provided in accordance with the invention.

The special features memory 70 is preferably in the form of a recirculating memory capable of storing 50 bits of information per recirculating cell with the bits divided up into three distinct sets of 16 bits each, with each set of 16 bits corresponding to four binary coded decimal digits, as illustrated in FIGURE 4. Four of these four bit words referred to in FIG. 4 as the called U, D, C and M digits are used to store the called number and one four bit word including bits 18–21 is used for control purposes. The remaining seven four bit words are used to identify the number to which the call is to be routed and includes the message digits A, B, C, U, D, C and M. In the 50 bit cell, bits 17 and 34 are provided as spare bits which separate the three 16 bit sets in each cell. The use of separate sets of 16 bits enables a check for the called number to be made from the access circuits during the circulation of information in the memory. Sufficient memory capacity is provided to meet the traffic requirements for the special services including the call forwarding class of service.

Figure 3:
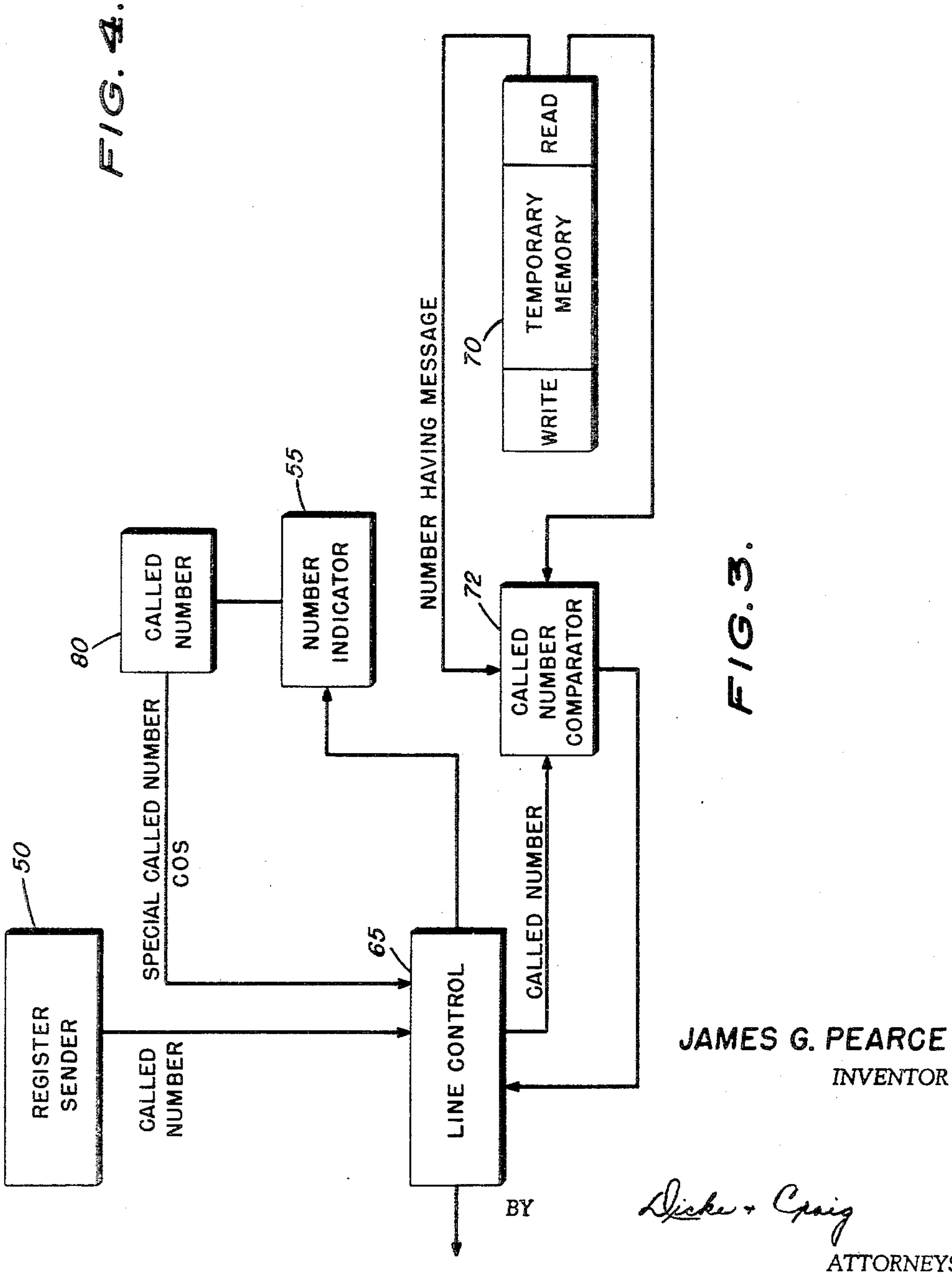
FIGURE 3 is a schematic block diagram of the arrangement in accordance with the present invention which effects for forwarding of a call from one station to another station in response to instructions stored in connection with the special class of service.

Referring now to FIGURE 3, which discloses the portion of the telephone switching system required for the call forwarding operation of the present invention, a called number comparator 72 is provided in conjunction with the line control 65 and the output of temporary memory 70 for purposes of comparing the information in the temporary memory with data provided from the line control 65. This comparator 72 may take any conventional form such as the well known AND gate matrix arrangement capable of effecting coincidence between identical binary designations for purposes of applying an instruction or message for control purposes.

For each call received in the telephone system and applied to the register sender 50 where it is eventually supplied to the line control 65 for purposes of marking the called line circuit and proceeding with the interconnection between the subscribers, the line control 65 applies each called number to the number indicator 55 which determines whether the called number has a special class of service available thereto, such as call forwarding, and if this special class of service is available to the called subscriber, an indication of the class of service is applied to the called number directory 80 which provides the proper routing information to the line control 65 to switch the called number to the comparator 72. On the other hand, if the called number does not have an available class of service requiring the services of the temporary memory 70, then the call is completed from the line control 65 in the normal manner without recourse to the memory. In this way, only those calls which have a class of service which may require the services of the temporary memory are applied to the comparator 72 to determine whether a message exists in connection with the called line circuit.

Upon insertion of the called number into the comparator 72 the information stored in the temporary memory 70 is sequentially applied to the comparator with the stored called number in each cell compared to the called number applied from the line control 65. If a message is present in the memory 70 in conjunction with a called number, for example, in a call forwarding situation the message would include a number to which calls must be forwarded, then coincidence between the called number from the line control 65 and that provided by the temporary memory 70 in the comparator 72 will provide for application of the message or instruction from the memory 70 to the comparator 72 where it is then passed on to the line control 65 in place of the called number received via the register sender 50.

While I have shown and described several embodiments in accordance with the invention, it is understood that the same is not limited thereto, but is susceptible of numerous changes and modifications as known to a person skilled in the art, and I therefore do not wish to be limited to the details shown and described herein, but intend to cover all such changes and modifications as obvious to one of ordinary skill in the art.

I claim:

1. In a telephone communication system including a register sender for receiving and processing a dialed instruction signal including the number of a called line circuit and a line control system responsive to said register sender for effecting interconnection between calling and called line circuits, a special class of service arrangement comprising temporary memory means for storing message signals relating to a special class of service in connection with select number signals, and means for connecting said temporary memory means to said line control system only in connection with dialed number signals having a special class of service including number indicator means connected to said line control system for indicating in repsonse to receipt of the number signal of said called line circuit whether the called number is a selected number entitled to a special class of service.

2. The combination defined in claim 1 wherein said means for connecting said temporary memory means to said line control system includes directory means responsive to said number indicator means for applying said called number signal from said line control system to said temporary memory means.

3. The combination defined in claim 2 wherein said temporary memory means includes a recirculating memory storing each select number signal having a special class of service and message signals in connection with at least certain of these select numbers, and comparator means for comparing the dialed select number from said line control system with the select numbers stored in said recirculating memory and returning any message stored in the memory in association therewith to said line control system upon coincidence of the select numbers therein.

4. The combination defined in claim 5 wherein said special class of service arrangement is a call forwarding arrangement and the message signals stored in said recirculating memory in association with stored select numbers are equipment numbers of line circuits to which the calling line circuit is to be connected in place of the line circuit designated by the dialed instruction.

5. The combination defined in claim 3, further including translator means connected to said register sender for receiving said dialed instruction signal, including a special class of service code, plus a message signal associated therewith for detecting the class of service designated by said code, means connected to said register sender for supplying thereto a signal representing the directory number of the line circuit providing said dialed instruction signal and router means responsive to said translator means for directing application of said calling number signal and said message signal to said line control system for storage in said temporary memory means.

6. The combination defined in claim 5 wherein said temporary memory means includes access means for effecting connection between said line control system and said recirculating memory only in response to indication from said number indicator means that said calling number is capable of obtaining the class of service indicated by the dialed code, said number indicator means being connected to said line control system for receipt of the calling number signal therefrom.

7. In a telephone communication system including a register sender for receiving and processing a dialed instruction signal including a special class of service code plus a message signal associated therewith, and a line control system responsive to said register sender for effecting interconnection between calling and called line circuits, a special class of service arrangement comprising temporary memory means for storing said message signals, number indicator means connected to said line control system for indicating whether a line circuit has a special class of service available, translator means connected to said register sender for detecting the class of service designated by said code, means connected to said register sender for supplying thereto a signal representing said dialed instruction signal, and router means responsive to said translator means for directing application of said calling number signal and said message signal to said line control system for storage in said temporary memory means.

8. The combination defined in claim 7 wherein said temporary memory means includes a recirculating memory and access means for effecting connection between said line control system and said recirculating memory only in response to indication from said number indicator means that said calling number is capable of obtaining the class of service indicated by the dialed code, said number indicator means being connected to said line control system for receipt of the calling number signal therefrom.

References Cited

UNITED STATES PATENTS

| | | | |
|---|---|---|---|
| 2,833,863 | 5/1958 | Kosten | 179—18 |
| 3,178,516 | 4/1965 | Bonanno | 179—18 |
| 3,280,268 | 10/1966 | Drake et al. | 179—27 |

FOREIGN PATENTS 971,602 9/1964 Great Britain.

RALPH D. BLAKESLEE, Primary Examiner

U.S. Cl. X.R.

179—27